July 23, 1929. W. T. POWLING 1,722,015
RECOVERY OF FATS, OILS, OR OLEAGINOUS SUBSTANCES
FROM MATERIALS YIELDING THEM
Filed Jan. 13, 1927
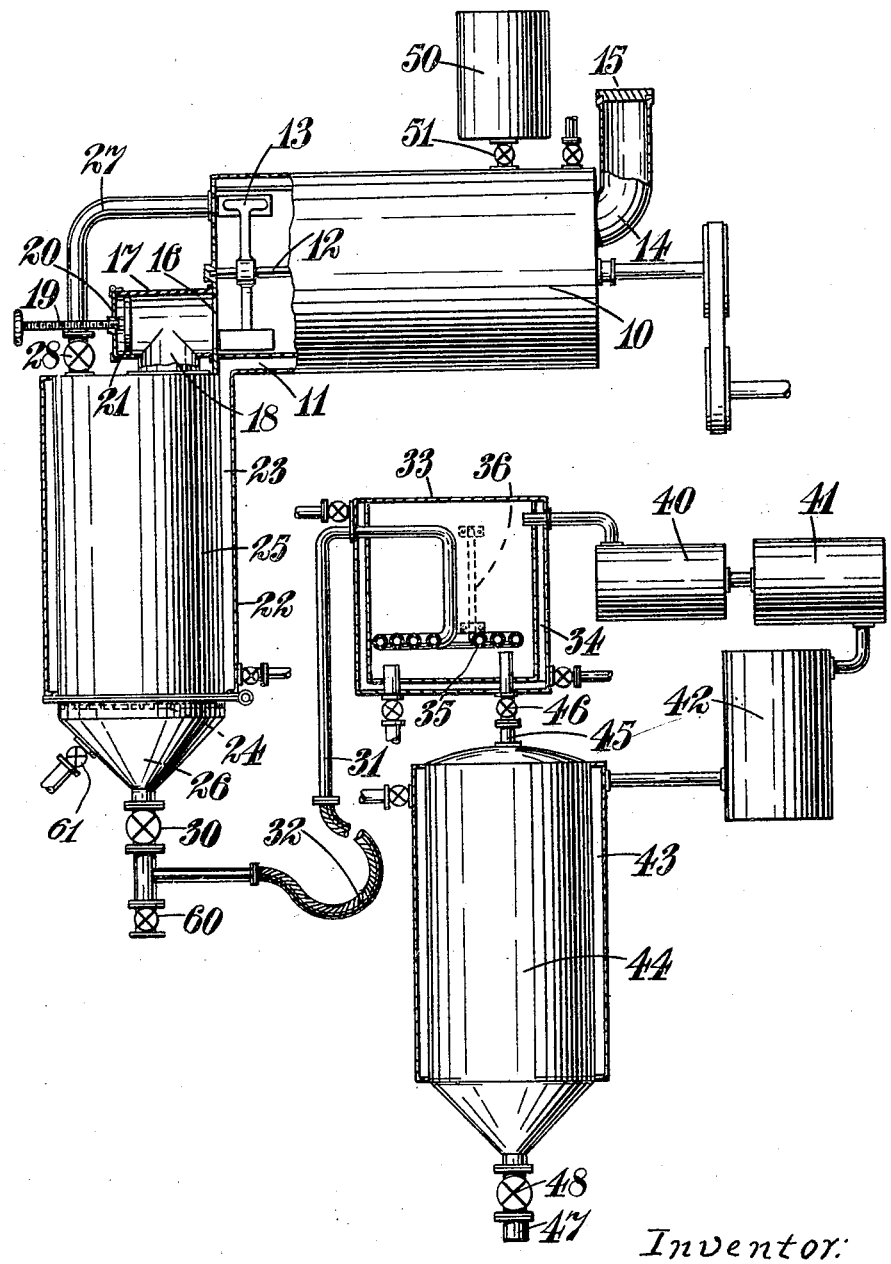
Inventor:
William Thomas Powling,
By. Byrnes, Stebbins + Parmelee,
attys.

Patented July 23, 1929.

1,722,015

UNITED STATES PATENT OFFICE.

WILLIAM THOMAS POWLING, OF LONDON, ENGLAND, ASSIGNOR TO JOHN WILLIAM PITTOCK, OF PHILADELPHIA, PENNSYLVANIA.

RECOVERY OF FATS, OILS, OR OLEAGINOUS SUBSTANCES FROM MATERIALS YIELDING THEM.

Application filed January 13, 1927, Serial No. 160,833, and in Great Britain January 29, 1926.

This invention relates to the recovery of fats, oils or oleaginous substances (hereinafter denoted generically for the sake of brevity by the expression "fats") from materials containing such substances. The invention is concerned with the well-known process of dry-rendering in which the materials to be treated for the recovery of the fat to be yielded by them are first submitted to the action of heat so as to melt down the fat and drive off the aqueous components of the materials, after which the liberated fat is allowed to drain from the solid residuals of the melting-down operation, and finally the fat which has not drained away from said residuals is extracted therefrom by some convenient means. Generally these means have comprised hydraulic filter presses, expellers and centrifugal separators, all of which are expensive forms of apparatus and incur in their operation very considerable labour, working and maintenance costs.

The main object of the present invention is to provide an improved process of the aforesaid type whereby the separation of the fat from the solid residuals (hereinafter referred to as the "cracklings") of the melting-down operation may be facilitated and in some cases carried considerably further than by the methods at present employed.

According to the present invention there is provided a dry-render process of recovery of fats from fat-yielding materials, which comprises, in combination, the steps of melting-down and subsequently subjecting the cracklings to the direct action of hot vapour, so as to facilitate the extraction of their fat content.

It has been found in general to be preferred to force the hot vapour through the cracklings. The forcing of the vapour through the cracklings may be effected either by admitting to the cracklings a supply of vapour under pressure or by sucking a current of vapour through the cracklings, or again, by a combination of these methods.

The hot vapour may be the vapour of water and according to a specific feature of the invention may be extraneously supplied steam, preferably extraneously supplied steam under pressure. The effect of forcing the hot vapour through the cracklings, for example, by the employment of extraneously supplied steam under pressure, is to enhance the fat-extracting action of the vapour.

According to a further feature of the invention the latter comprises a dry-render process which consists in melting down a batch of fat-yielding material and concurrently passing the hot vapours produced through cracklings of a previously melted down batch of material so as to facilitate extraction of fat therefrom.

When operating according to this feature of the invention, the hot vapours are preferably, as before, forced through the cracklings either by pressure or by suction. The pressure required for forcing the hot vapours through the cracklings would be the pressure generated in the degreaser.

According to a further feature still, the invention comprises a process embodying the feature last referred to in combination with the step of subjecting the cracklings also to the direct action of extraneously supplied steam, preferably, as before, extraneously supplied steam under pressure.

A preferred embodiment of this last feature of the invention is one wherein the steam treatment of the cracklings is a treatment applied as a final step in the extraction of fat from the cracklings after the latter have been subjected to the action of the hot vapours produced in the melting-down operation proceeding concurrently upon a fresh batch of fat-yielding material.

The degree of pressure-difference established in the path of the vapours in order that the vapours shall be forced through the cracklings, is a factor which is susceptible to adjustment according to circumstances. It may be stated, however, that in the step of treating the cracklings with extraneously supplied steam, steam of about 30 to 40 lbs. pressure may be forced through the cracklings.

A further object of this invention is to provide an improved process of the type hereinbefore referred to which shall not be objectionable, as dry-render processes have hitherto been, by reason of the incurrence of nuisance by the emission of foul odours during the conduct of the process.

With this object in view, the invention includes a dry-render process which comprises melting down a batch of fat-yielding material, concurrently passing the hot vapours produced through cracklings of a previously melted down batch of material, so as to facilitate the extraction of fat therefrom, and "collecting" the vapours after they have passed through the cracklings, the operations of melting-down and extracting the fat from the cracklings and the transference of the material from the region of melting-down to the region of fat-extraction, being effected in such manner that the material is at no time exposed to the atmosphere.

The expression "collecting" has been employed to denote any convenient step of disposing of the vapours in such manner that they are prevented from creating a nuisance by contaminating the atmosphere in the vicinity of operations. The vapours, to this end, could be withdrawn from the cracklings and discharged into the upper layers of the atmosphere by means of a suitable flue. Alternatively, the vapours could be discharged into a drain or into a body capable of absorbing the foul-smelling gases. The use of any of these means, and all equivalent means, is intended to be included by the expression "collecting the vapours."

An important advantage accruing to the treatment of the cracklings with steam according to this invention, is that the cracklings tend to become softened by the treatment and thereby rendered more susceptible to crushing, for example for the production of fertilizers and live-stock foods. This softening effect is to be distinguished, however, from the effect produced in wet-rendering processes. The steam treated cracklings of the present invention although in a softened condition are not in a wet state. The steam does not appear to condense upon the cracklings and permeate them with water; they are practically as dry after the steam treatment as they were at the conclusion of the melting-down operation.

The duration of vapour treatment of the cracklings is also a factor susceptible to adjustment according to circumstances, as will be at once appreciated by those acquainted with the art. It may be added in this connection that with certain materials the degree of softening of the cracklings can be controlled by controlling the duration of steaming; the prolongation of that duration generally increasing the degree of softening that takes place.

It will be understood that the expression "extraneously supplied steam" is used herein in reference to live steam supplied from a boiler or other extraneous source of steam in contrast to water vapour which may be derived from a batch of fat-yielding materials undergoing melting-down concurrently with the extraction of fat from the cracklings of a batch of material which has been previously melted down.

In my concurrently filed application Serial No. 160,834 I have described a form of apparatus for use in dry-render recovery of fats from fat-yielding materials and as this apparatus is suitable for carrying into effect the improved process of this invention, the latter will now be described by way of example with reference to that form of apparatus. With this object in view, there is appended to the specification a drawing which illustrates said apparatus.

Briefly described, the apparatus comprises the following parts: a degreaser 10, a fat-extractor 25, a fat-settling tank 33, a vacuum pump 40, a deodorizing device 41, a jet condenser 42 and a fat-cooler 44. These elements are all connected in series with one another by air-sealed conduits and passages so that the whole system is what may be termed an enclosed system, in which the materials are at no time exposed to the atmosphere.

The degreaser 10 is a jacketed vessel, the jacket being for a heating medium such as steam derived from any convenient source. Likewise, the extractor is provided with a jacket 22, 23 and conveniently the jackets of the two vessels are in open communication with one another as shown. The degreaser 10 is provided with a rotary agitator 13 mounted upon a horizontal shaft 12. The degreaser is also provided with a feed-hopper 14 closed with a tight fitting closure member 15. The degreaser also has an outlet 16 at the other end in association with a valve and valve casing 17, 18, 19, 20 and 21. The valve casing is formed with a downwardly directed branch 18 which leads into the top of the extractor 25.

The valve 21 operates to control the discharge of cracklings and fat from the degreaser 10 to the extractor 25. During the degreasing operation the valve 21 occupies, of course, a position at the opposite end of the casing 17 so as to close the outlet 16 and retain both cracklings and fat in the degreaser.

The extractor 25 is divided horizontally by a grid 24 into an upper portion and a lower portion, the lower portion being denoted by the numeral 26. The two portions of the extractor are hinged together at a level approximate to the level of the grid 24 as shown, so that the lower portion may be swung downwardly to enable the extractor to drop its crackling content which normally rests upon the grid 24.

The upper part of the interior of the degreaser 10 communicates by a conduit 27 with the upper part of the extractor 25, the said conduit 27 being controlled by a valve 28.

The bottom of the extractor 25 communicates with the fat-settling tank by a conduit 31 having a flexible section 32 and controlled by a valve 30. The conduit 31 leads, as shown, into the interior of the fat-settling tank and down to the bottom thereof, terminating in a horizontal coil provided with perforations.

The upper part of the fat-settling communicates with the inlet of the vacuum pump 40. The bottom of the fat-settling tank communicates by a conduit 45 with the crown of the fat-cooler 44, and this conduit is controlled by a valve 46. The other connections need no description.

The fat-settling tank is a jacketed vessel, the jacket being indicated by the numeral 34. The jacket 34 is a heating jacket and any convenient heating medium may be employed.

The operation of the process is briefly as follows: A charge of fat-yielding material is introduced into the degreaser 10 through the hopper 14 and is therein subjected to the dry-render action of heat, the heat being derived from the heating media flowing through the jacket 11, and the material all the while being agitated by the agitator 13. During this operation, hot vapours produced in the degreaser are allowed to escape therefrom and pass by way of the conduit 27, into the extractor 25. Here they meet a charge of cracklings derived from a previously melted down batch of fat-yielding material. The cracklings are resting upon the grid 24 and fat is draining from them into the fat-settling tank by way of the conduit 31. The hot vapours have the action of facilitating the extraction of fat from the cracklings and the process is continued till an economical maximum of percentage of fat has been recovered, whereupon the lower half of the extractor is swung away from the upper part and the extractor is emptied of its crackling content.

The fat, and any aqueous condensate that has formed, gradually fills the settling-tank, the fat rising to the surface and the aqueous condensate sinking to the bottom. A level indicator 36 is provided on the tank to indicate the level of the fat in the tank.

The gases and uncondensed vapours entering the tank along with the fat through the conduit 31 are withdrawn from the upper part of the settling tank by the action of the vacuum pump 40, and they are subjected to a deodorizing treatment in the deodorizer 41 and condensation in the jet condenser 42.

At intervals, the fat is withdrawn from the settling tank into the agitating cooler 44 from which it is withdrawn at the outlet 47 which is controlled by the valve 48.

As will be appreciated, the volume of the original material introduced into the degreaser 10 will be much reduced by the dry-render action proceeding therein. Consequently, the extractor 25, if of approximately the same size as the degreaser, as shown, will be capable of containing above its grid several charges of cracklings from the degreaser. In practice, the arrangement may be such that the extractor is capable of taking 7 or 8 charges of cracklings. As will be at once understood, therefore, the cracklings in the degreaser 25 are being subjected to the direct action of a current of hot vapours from the degreaser 10 for a considerable period of time—usually several hours. This, as previously stated, has the effect of causing the fat content of the cracklings to separate and flow through the grid 24 and conduit 31 to the fat-settling tank.

It has been found that the percentage of recovery of fat obtained by the process so far described is very favourably comparable with the recovery when the cracklings are subjected, as at present, to the action of mechanical fat-extracting devices. The recovery, however, can be enhanced by subjecting the cracklings, after the operations aforesaid, to the direct action of live steam supplied under pressure from an extraneous source such as a plant boiler. This steam would be admitted by the conduit 61 which is controlled by a valve 62, and it would follow the course that the hot vapours had previously followed from the conduit 27 through the aggregated mass of cracklings upon the grid 24, and so on to the fat-settling tank, vacuum pump, deodorizer device, etc.

The pressure of the live steam admitted to the extractor may be varied according to circumstances as found most suitable for the effect to be attained. It will generally be found, however, that a pressure of between 30 and 40 pounds per square inch is a satisfactory pressure to employ.

During the degressing operation in the degresser 10 and the concurrent fat-extracting operation proceeding in the extractor 25 by reason of the flow therethrough of the hot vapours from the degresser 10, the pressures obtaining in the various elements of the system may be adjusted according to circumstances. In some cases it will be found desirable to open the valve 28 so as to place the degreaser into free communication with the extractor 25 and to create a partial vacuum in the system by operating the vacuum pump 40. By thus creating a partial vacuum, the flow of vapours through the cracklings in the extractor 25 may be increased and, as will be understood, it will be desirable to operate in this manner towards the close of a degreasing operation when there is a smaller rate of production of vapours as compared with the early part of a degreasing operation. On the other hand, it is sometimes desirable only periodically to open the valve 28, allowing the pressure in the degreaser to rise and suddenly releasing the compressed vapours in the extractor 25. A spasmodic rush of vapours through the cracklings has been found to have an enhanced fat-extracting effect upon the cracklings. This can be readily envisaged.

As previously stated, the form of apparatus under description is characterized in that it is an enclosed system and, as previously indicated herein, it is a feature of the present invention that the exhaust foul-smelling vapours are collected and so disposed of as to inhibit the creation of a nuisance in the immediate vicinity of the plant. For this purpose, the gases are, as aforesaid, subjected to deodorizing treatment and following this, condensation. Any uncondensed gases or vapours, after flowing through the jacket 43 of the cooler 44, may be discharged.

It is an advantage in connection with the use of live steam to employ dry steam if this be economically available. There is less tendency to condensation upon the cracklings.

It will be understood that the invention is by no means limited to the example just described. Any form of apparatus may be employed, and, as will be appreciated, in the event of live steam alone being employed as the hot fat-extracting vapour, the apparatus may be very considerably simplified, especially if that feature of the invention is omitted which provides for "collection" of the vapours so as to inhibit nuisance by foul-smelling odours. For example, the apparatus may comprise simply a degreaser in combination with a crackling drainage receptacle and means to admit live steam into this receptacle so that the steam is caused to flow through the cracklings.

I claim:

1. In a process of dry-rendering fat-yielding materials of the type wherein the material is dry-rendered so as to produce cracklings which are substantially water-free and the cracklings so produced are separated by draining from rendered fat, the step which consists in subjecting the separated cracklings in a heated condition to the action of hot vapor to promote the extraction of their residual fat-content, this step being effected under temperature and pressure conditions which are substantially inhibitive of condensation in the presence of the cracklings of the hot vapors.

2. A dry-render process of recovery of fats from fat-yielding materials which comprises the steps in combination of dry-rendering one batch of material so as to produce cracklings which are substantially water-free, and concurrently with this operation passing the hot vapors produced therein through drained and still-hot cracklings of a previously rendered batch of material so as to promote the extraction of residual fat from said cracklings, this vapor-treatment of the cracklings being effected under conditions of temperature and pressure which are substantially inhibitive of condensation in the presence of the cracklings of the hot vapors.

3. A dry-render process for the recovery of fats from fat-yeilding materials which comprises the steps in combination of dry-rendering one batch of the material so as to produce cracklings which are substantially water-free, and concurrently with this operation forcing the hot vapors produced therein and also extraneously supplied steam through drained and still-hot cracklings of a previously rendered batch of material so as to promote the extraction of residual fat from said cracklings, this treatment of the cracklings being effected under conditions of temperature and pressure which are substantially inhibitive of condensation in the presence of the cracklings of the hot vapors and the steam.

4. A dry-render process for the recovery of fats from fat-yielding materials, which comprises the steps in combination of dry-rendering the material so as to produce cracklings which are substantially water-free, and concurrently with this operation forcing the hot vapors produced therein through drained and still-hot cracklings of a previously rendered batch of material to promote the extraction of residual fat from said cracklings and thereafter subjecting the latter to the action of extraneously supplied steam under pressure to carry still further the extraction of residual fat from the cracklings, the said treatment of the drained cracklings being effected under conditions of temperature and pressure which are substantially inhibitive of condensation in the presence of the cracklings of the hot vapors and the steam.

5. A process as claimed in claim 4, wherein the extraneously supplied steam is steam at a pressure of substantially between 30 and 40 pounds per square inch.

6. A dry-render process for the recovery of fat from fat-yielding materials, which comprises dry-rendering one batch of material so as to produce therefrom cracklings which are substantially water-free, and concurrently with this operation passing the hot vapors produced therein through drained and still-hot cracklings of a previously rendered batch of material so as to promote the extraction of residual fat from said cracklings, and collecting the vapors after they have passed through the cracklings, the operations of rendering the fat-yielding material and extracting the fat from the cracklings and the transference of the material from the region of rendering to the region of fat-extraction being effected in such manner that the material is at no time exposed to the atmosphere.

7. A dry-render process for the recovery of fat from fat-yielding materials, which comprises dry-rendering one batch of material so as to produce therefrom cracklings which are substantially water-free, and concurrently with this operation forcing the hot vapors produced therein through drained and still-hot cracklings of a previously rendered batch of material so as to promote the extraction of residual fat from said cracklings, thereafter subjecting the cracklings to the direct action of extraneously supplied steam under pressure so as to carry further the extraction of fat, and collecting the vapors after they have passed through the cracklings, the operations of rendering the fat-yielding materials and extracting the fat from the cracklings and the transference of the material from the region of rendering to the region of fat-extraction being effected in such manner that the material is at no time exposed to the atmosphere.

8. A process as claimed in claim 1, wherein the hot vapour is forced through the cracklings.

9. A process as claimed in claim 1, wherein the hot vapour is extraneously supplied steam.

10. A process as claimed in claim 1, wherein the hot vapour is extraneously supplied steam under pressure.

11. A process as claimed in claim 3, wherein the hot vapours produced in the rendering operation are forced through the cracklings partly by reason of pressure obtaining in the region of production of the vapours and partly by suction applied to the point of exit of the vapours from the cracklings.

12. A process as claimed in claim 3, wherein the extraneously supplied steam is steam at a pressure of substantially between 30 and 40 lbs. per square inch.

13. A process as claimed in claim 4, wherein the said hot vapours are forced through the cracklings partly by reason of pressure obtaining in the region of production of the vapours and partly by suction applied to the point of exit of the vapours from the cracklings.

In testimony whereof I affix my signature.

WILLIAM THOMAS POWLING.